US005898785A

United States Patent [19]

Cornell et al.

[11] Patent Number: 5,898,785

[45] Date of Patent: Apr. 27, 1999

[54] MODULAR MAILING SYSTEM

[75] Inventors: Edward P. Cornell; Jerome E. Jackson, both of Newton; Wallace Kirschner, Trumbull; Richard A. Malin, Westport; Edward J. Naclerio, Madison; Maria P. Parkos, Southburg; John H. Steinmetz, Bridgeport, all of Conn.

[73] Assignee: Pitney Bowes Inc., Stamford, Conn.

[21] Appl. No.: 08/724,131

[22] Filed: Sep. 30, 1996

[51] Int. Cl.$^{6}$ .......... H04L 9/00

[52] U.S. Cl. .......... 380/51; 705/408

[58] Field of Search .......... 380/51; 235/492; 364/709.1; 705/401, 408

[56] References Cited

U.S. PATENT DOCUMENTS

| | | | |
|---|---|---|---|
| 4,775,246 | 10/1988 | Edelmann et al. | 380/51 |
| 4,802,218 | 1/1989 | Wright et al. | 380/51 |
| 4,813,912 | 3/1989 | Chickneas et al. | 380/51 |
| 4,835,713 | 5/1989 | Pastor | 380/51 |
| 4,864,618 | 9/1989 | Wright et al. | 380/51 |
| 4,900,903 | 2/1990 | Wright et al. | 235/380 |
| 4,908,502 | 3/1990 | Jackson | 235/492 |
| 4,949,381 | 8/1990 | Pastor | 380/51 |
| 4,978,839 | 12/1990 | Chen et al. | 235/492 |
| 5,007,083 | 4/1991 | Constant | 380/9 |
| 5,121,432 | 6/1992 | Gilham et al. | 380/51 |
| 5,189,700 | 2/1993 | Blandford | 380/23 |
| 5,467,709 | 11/1995 | Salomon | 101/93 |
| 5,526,271 | 6/1996 | Abumehdi | 364/464.02 |
| 5,544,579 | 8/1996 | Gallagher et al. | 101/91 |
| 5,552,776 | 9/1996 | Wade et al. | 340/825.31 |
| 5,583,779 | 12/1996 | Maclerio et al. | 380/51 |
| 5,583,970 | 12/1996 | Strobel | 395/114 |
| 5,684,949 | 11/1997 | Naclerio | 380/51 |
| 5,696,829 | 12/1997 | Cordery et al. | 380/51 |

*Primary Examiner*—Salvatore Cangialosi

*Attorney, Agent, or Firm*—Steven J. Shapiro; Melvin J. Scolnick

[57] ABSTRACT

A mailing system includes a mailing machine having a printing mechanism for printing an indication of postage value on a mailpiece and structure for controlling relative movement between the printing mechanism and the mailpiece to ensure the mailpiece is properly positioned relative to the printing mechanism during printing of the indication of postage value; a meter vault having a securely sealed housing, and apparatus, within the securely sealed housing, for accounting for the printed indication of postage value, wherein the meter vault is removably mounted in the mailing machine for easy removal via a plug-in connector; and a printing mechanism control module for securely controlling printing by the printing mechanism based on data received from the meter vault, the printing mechanism control module being removably mounted in the mailing machine for easy removal via a quick disconnect connector; wherein the meter vault and the printing mechanism control module are in electrical communication via the mailing machine. The mailing system can also include ciphered communications between the vault and the printing mechanism.

4 Claims, 2 Drawing Sheets

MODULAR MAILING SYSTEM

BACKGROUND

This invention relates to a mailing system, and more particularly to a digital mailing system incorporating a modular design.

Value dispensing systems are apparatus which dispense an indication of value. Examples of such value dispensing systems are postage meters, tax stamp machines, lottery vending machines, and admission ticket dispensing machines. With regard to postage meters, the indication of value printed, on a mailpiece or mailing label, is a postal indicia. The postage meter can be a stand-alone type postage meter containing, within a single securely sealed housing, accounting structure to account for the value of the postage dispensed by the meter and the total amount of postage funds added to the meter. In conventional stand-alone postage meters, the accounting structure is mechanically coupled to the printing mechanism which prints the postal indicia. Moreover, both the accounting structure and the printing mechanism are contained in the securely sealed housing except for that portion of the printing mechanism which necessarily extends out of the housing to print the postal indicia. The sealed secure housing had conventional mechanical security devices, such as sealed screws, which would permit a visual indication that tampering of the postage meter had occurred if the seals were broken. Accordingly, the maintenance and repair of the postage meter had to be done by a certified technician to ensure that once the securely sealed housing of the postage meter was opened up and the maintenance and/or repair completed, the housing was resecured with the appropriate mechanical security devices. This complex procedure added to the downtime and repair cost of a broken meter.

In addition to stand-alone postage meters, there are mailing systems which are a combination of a postage meter removably mounted on a mailing machine (also referred to as a base). The mailing machine provides the necessary structure for moving the recording medium (such as envelopes and tapes) upon which the postal indicia is to be printed, from a feeding position to the postage meter printing device. In the simplest mailing machine, only a recording medium feeding mechanism is included. In more sophisticated mailing machines, known structure is provided along the mailpiece feed path to accomplish additional functions such as singulating individual envelopes, moistening envelope flaps, and opening envelope flaps, all of which typically occur prior to the envelopes being fed and presented to the postage meter printing mechanism for printing of the postal indicia. In these conventional mailing systems (mailing machines in combination with postage meter), the accounting structure of the postage meter is mechanically coupled to the postage meter printing mechanism and both are contained in a securely sealed postage meter housing.

With the advent of new printing technologies, such as ink jet printing, it has been proposed to provide postage meters with ink jet printers. Additionally, since the ink jet printers are electronically versus mechanically driven, the postage meter accounting circuitry can be mechanically decoupled from the printing mechanism since only an electrical communication between the two is required. Moreover, new ink jet printing technology has, for example, permitted the use of smart cards as the structure for securely housing the accounting circuitry of the postage meter, which cards are referred to as smart card meter vaults. The smart card vault is removably placed into a conventional smart card receptacle mounted in a secure postage meter housing. The secure housing contains the postage meter printer together with other circuitry for performing additional meter functions such as communicating through a postage meter display and keyboard with a postage meter operator and controlling the printer motor or motors which move the printer as desired. This particular smart card structure is described in U.S. Pat. No. 4,900,903 issued to Wright, et al. on Feb. 13, 1990. In the aforementioned Wright patent, the printing mechanism includes, a microprocessor unit which controls the printing mechanism. However, because the printing mechanism and the smart card vault communicate via an unsecure communications link, security becomes an issue in that it is possible to drive the printing mechanism to print an indicia without accounting for the postage dispensed by tapping into the unsecure communications link. In an attempt to solve the security problem, the Wright structure ensures that the microprocessor unit for the printing mechanism will not operate the printing mechanism to print the postal indicia until a mutual authentication handshake has occurred between the smart card vault and the printing mechanism microprocessor unit. Moreover, in order to provide additional security, the microprocessor unit is formed integrally with the printing mechanism and is embedded in epoxy or the like so that it cannot be physically accessed without destroying the microprocessor unit and also the printing mechanism. Accordingly, the Wright postage meter, like the previously discussed devices, requires some type of secure mechanical protection for the printing mechanism of the postage meter. Accordingly, if the printhead microprocessor unit in the Wright apparatus is not operating properly the whole printing mechanism must be changed at a significant cost to the user.

Due to the strict security requirements of postage meters, conventional mailing systems have included the postal indicia printing mechanism as part of the secure postage meter and not as part of the mailing machine. In the United States, where postage meters can only be rented, a customer can buy a mailing machine but must still rent a postage meter to have a complete mailing system. In order to potentially reduce postage meter rental costs, it is desirable to include the printing mechanism as part of the mailing machine so that only a meter vault needs to be rented versus a meter vault/printer combination.

Accordingly, what is needed is a mailing system including accounting and printing modules which are mechanically decoupled from each other but which communicate in a secure manner. Moreover, the overall mailing system design should be modular to include individual removably mounted functional modules which can be readily accessed and removed for repair.

SUMMARY OF THE INVENTION

It is an object of the present invention to provide a modular mailing system in which key functional components are designed removable modules in order to improve maintenance downtime.

It is also an object of the present invention to provide a mailing system wherein the accounting and printing structures are mechanically decoupled from each other to provide flexibility in system design and modification.

The above objects are met by a mailing system including a mailing machine having a printing mechanism for printing an indication of postage value on a mailpiece and structure for controlling relative movement between the printing mechanism and the mailpiece to ensure the mailpiece is properly positioned relative to the printing mechanism during printing of the indication of postage value; a meter vault having a securely sealed housing, and apparatus, within the securely sealed housing, for accounting for the printed indication of postage value, wherein the meter vault is removably mounted in the mailing machine for easy removal via a plug-in connector; and a printing mechanism control module for securely controlling printing by the printing mechanism based on data received from the meter vault, the printing mechanism control module being removably mounted in the mailing machine for easy removal via a quick disconnect connector; wherein the meter vault and the printing mechanism control module are in electrical communication via the mailing machine.

It is a further object of the invention to provide a mailing system wherein an image generator is part of the meter vault and the image data generated by the image generator is ciphered prior to being sent to the printhead.

The above object is met by a mailing apparatus having a printing mechanism for printing an indication of postage value on a mailpiece; a postage meter vault having a securely sealed housing, structure, mounted in the securely sealed housing, for accounting for the printed indication of postage value, and an image generator which is mounted in the securely sealed housing and which generates image data corresponding to the indication of postage value to be printed; and structure for controlling the printing mechanism to print the indication of postage value utilizing the image data generated by the image generator. The meter vault further includes within the securely sealed housing structure for ciphering the image data generated by the image generator and for sending the ciphered image data to the controlling structure, and the controlling structure includes apparatus for deciphering the ciphered image data and for utilizing the deciphered image data to control printing of the indication of postage value by the printing mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
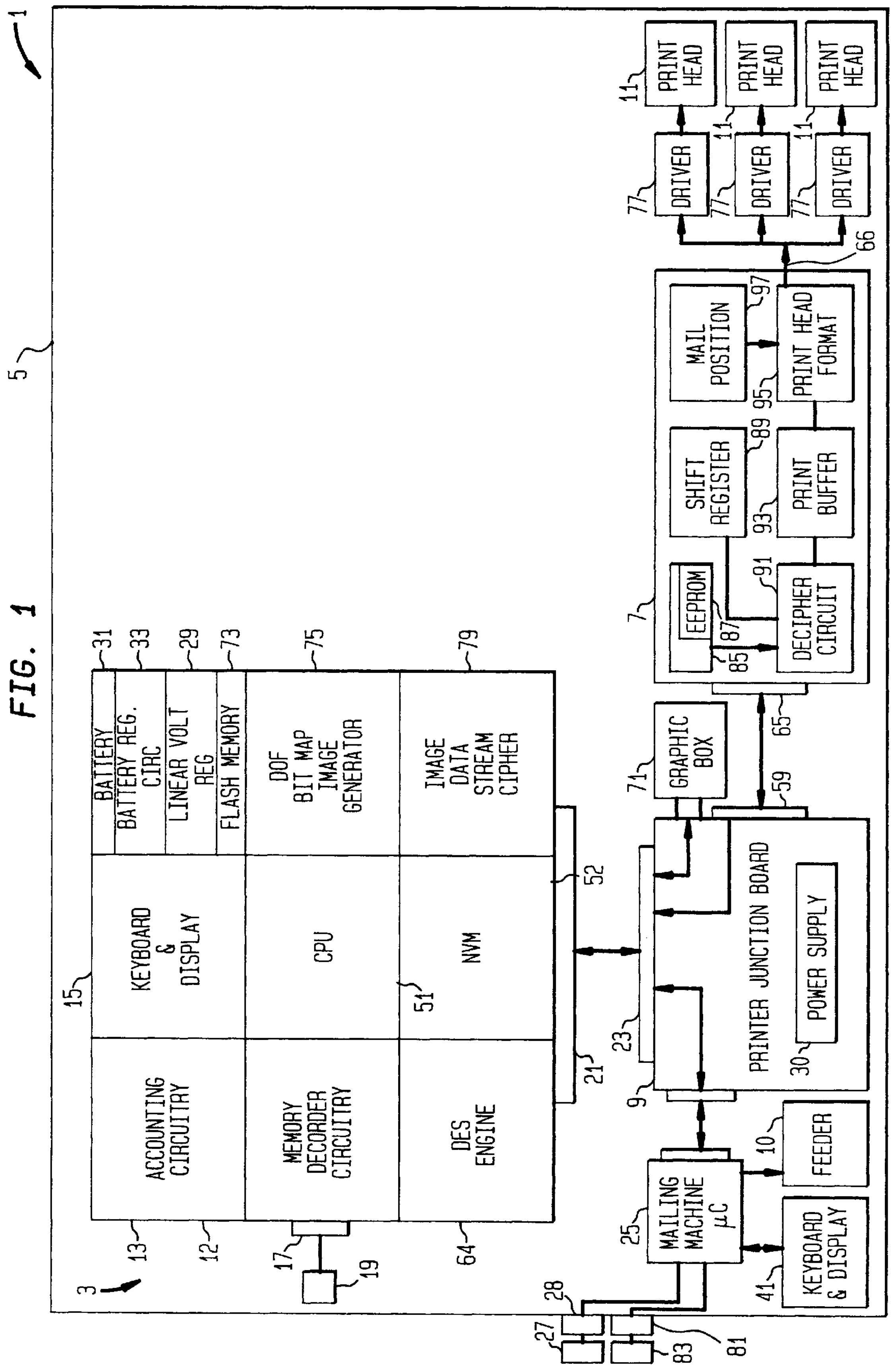
FIG. 1 is an electrical block diagram of the inventive mailing system.
Figure 2:
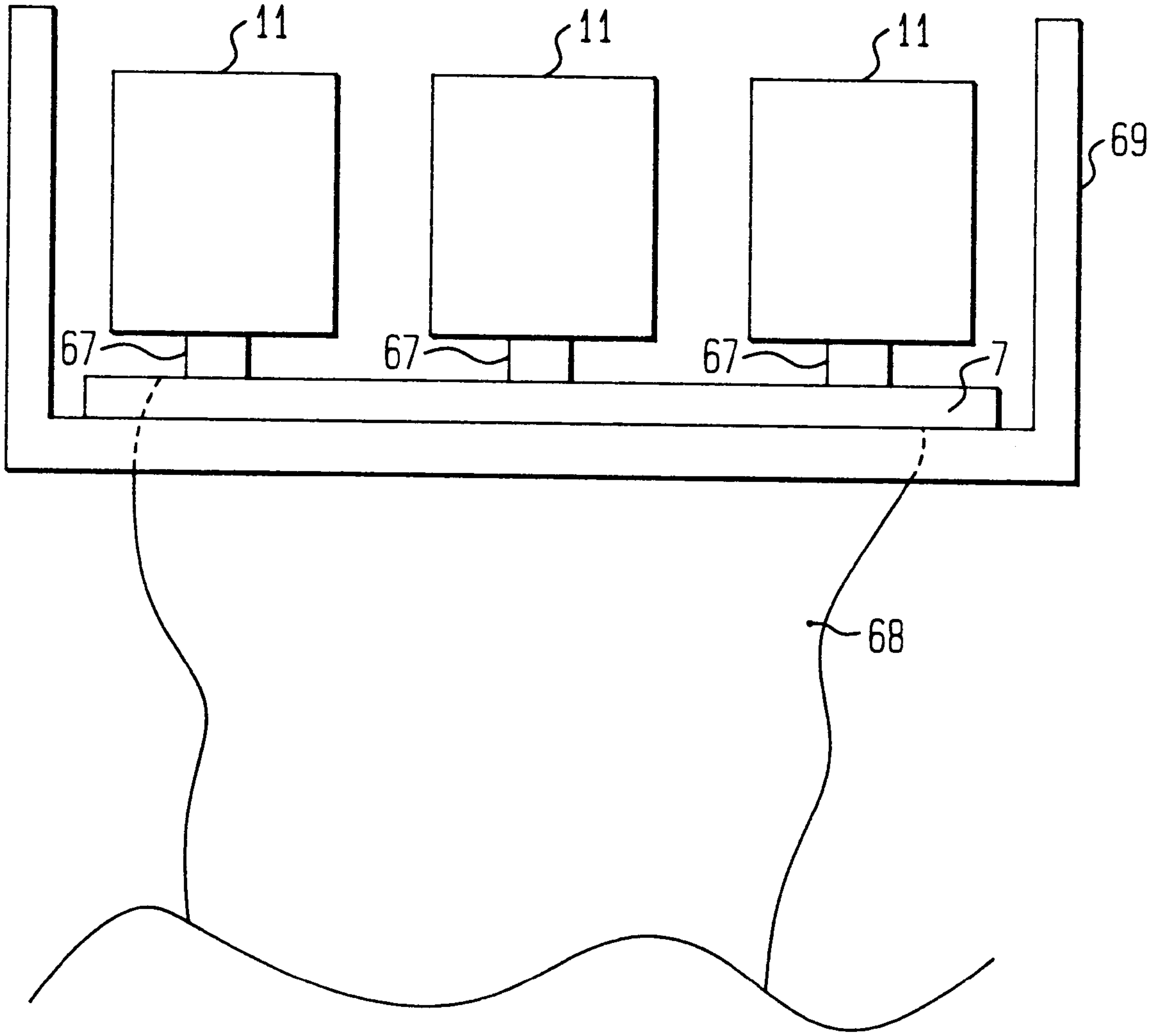
FIG. 2 shows a structure for mounting printheads and a printhead control module to a moveable carriage.

FIGS. 1–3 set forth the electronic architecture for a mail processing system 1. Mail processing system 1 includes a meter vault 3, a mailing machine 5 (shown schematically in block form), a printhead control and security module 7, a printer junction board 9, and a plurality of printheads 11 which are ganged together, in the preferred embodiment, to form a single printing unit. The plurality of ganged printheads 11 are used to improve printing speed and thereby increase the mailpiece throughput. However, the invention is equally applicable to a single printhead structure.

As previously discussed, mailing machine 5 is a structure which is well known in the art and includes for the purposes of this specification any type of mail handling structure which transports and feeds an item of mail to printheads 11 for printing of a postal indicia. Examples of known mail handling machines can be found in U.S. Pat. Nos. 5,467,709 and 5,544,579 which are each incorporated herein by reference. In FIG. 1, a mailpiece feeder is shown schematically at 10.

Regarding printheads 11, they are movably mounted within mail handling machine 5 to be movable between a fixed printing position, a tape printing position, and a maintenance station position where servicing of printheads 11 is accomplished in a known manner. An example of the structure for moving printheads 11 is set forth in the aforementioned U.S. Pat. No. 5,467,709. Accordingly, in operation, when printheads 11 have been moved to the printing position, mailing machine 5 feeds individual mailpieces, via feeder 10, beneath printheads 11 which are energized in synchronization with mailpiece movement to print the postal indicia on the mailpiece. In the preferred embodiment, printheads 11 are ink jet printheads and can either be of the bubble jet type or the piezo actuated type.

Postage meter vault 3 includes a securely sealed housing 12 within which a conventional meter vault accounting circuit 13 is contained. Additionally, the secure meter vault module 3 includes a keyboard/display device 15 mounted in an exterior surface of the sealed housing 12 for use as will be discussed in more detail below. The sealed housing 12 also has a first external connector 17 to permit electronic interface between meter vault 3 and an external interface unit (EIU) 19, and a second external connector 21 to permit connection to a complementary connector 23 extending from printer junction board 9. Thus, by way of the connectors 21, 23 and printer junction board 9, meter vault 3 communicates with and receives d.c. power from mailing machine 5 via mailing machine microcontroller 25. Additionally, by way of printer junction board 9, meter vault 3 communicates with printhead controller and security module 7 for driving printheads 11.

When meter vault 3 receives d.c. power from mailing machine 5 a linear voltage regulator 29 conditions the d.c. power coming from mailing machine 5 to provide the required logic power for meter vault 3. Alternatively, when meter vault 3 is removed from mailing machine 5, a battery 31 and a battery regulator circuit 33 provide the logic power required by meter vault 3 to support meter inspections and refill operations. The same inspections and refill operations can also be accomplished, in a conventional manner, when meter vault 3 is installed in mailing machine 5 utilizing a modem 27 in communication with meter vault 3 via a connector 28, microcontroller 25, printer junction board 9 and connectors 21, 23. Meter vault keyboard/display 15 is used to permit communication between an operator and meter vault 3 for the purpose of inspections and refills when meter vault 3 is not connected in mailing machine 5. Furthermore, power for printheads 11 can either be provided by mailing machine 5 via printer junction board 9 or from a separate power supply 30.

Mailing machine 5 includes its own keyboard/display 41 through which a mailing system operator communicates with mailing machine microcontroller 25 to initiate desired postage transactions and inspection operations. Accordingly, when meter vault 3 is removably mounted in mailing machine 5 to printer junction board 9, operator input and output of meter vault 3 is handled by keyboard/display 41 and not via the meter vault keyboard/display 15. Messages received by meter vault 3 from mailing machine 5 are received by a central processing unit (CPU) 51. CPU 51, utilizing programs stored in associated nonvolatile memory (NVM) 52, responds to the message received from mailing machine 5 after having taken the appropriate action requested by mailing machine 5. In a basic meter operation, where an operator has requested, via the mailing machine keyboard display 41, that postage be dispensed, CPU 51 checks a descending register within accounting circuit 13. If the desired postage is available, CPU 51 initiates a security protocol with printhead controller/security module 7, reduces the descending register by the desired postage amount and generates and sends the postal indicia image data to printhead controller/security module 7.

Meter vault 3 also includes a Digital Encryption Standard (DES) engine 64 to support the encrypted communications between the printer controller/ security module 7 and meter vault 3 as well as to generate digital tokens in the indicia which are used by the postal service and the meter vendor to authenticate the printed indicia. NVM 52 additionally has a printer controller/ security module master key stored therein which is used by CPU 51 as part of a security protocol, as discussed in more detail below, to verify that the printer controller/security module 7 is an authorized device prior to dispensing postage. In a preferred embodiment, the printer controller/ security module master key is not stored in the clear but is stored in encrypted form for additional security. The encrypted printer controller/security module master key is encrypted utilizing a second key stored in NVM 52, which second key is different for each meter vault 3 thereby minimizing the security impact to a family of meters if the second key of a particular meter is compromised.

As an alternative to the dual key structure described above, a unique printer controller/ security module key for each meter vault and printer controller/ security module combination is loaded into meter vault 3 by remotely interfacing through modem 27 with a remote key management data center. However, in this scenario, if the printer controller/ security module 7 were integrally formed as part of printheads 11, a call to the data center would have to be made each time the printheads 11 were changed. By making printer/controller module 7 a separate removable unit which is mounted in mailing machine 5 via connectors 59, 65 to printer junction board 9 and to print heads 11 via a flexible cable 66 to accommodate for the previously discussed movement of printheads 11, printheads 11 can be replaced without requiring a call to the data center. A data center call would only be required when a new meter vault and printer controller/security module combination is encountered. One skilled in the art will recognize that alternatively, as shown in FIG. 2, printer controller/security module 7 can be releasably directly connected via connectors 67 to printheads 11 while being connected to printer junction board 9 via a flexible cable 68. In this configuration, printheads 11 plug into printer controller/security module 7 which itself is mounted to a printhead carriage 69 which carriage 69 is moved between the printing, tape, and maintenance positions. For further security, the printer controller/security module 7 and connector 67 can be physically secured by being embedded in epoxy such that once printheads 11 are plugged into connectors 67, access to printer controller/ security module 7 is essentially prevented. Thus, in either of the above-discussed embodiments, replacement of printheads 11 becomes a simple operation and precludes requiring a data center call for key management each time a printhead is replaced. It is also to be noted that any of the flexible cable connections discussed above can be a quick disconnect type of connector which allows for the easy replacement of the following individual functional modules: vault meter 3, printer junction board 9, printer controller/ security module 7, and printheads 11.

Communication between meter vault 3 and a graphics interface box 71 permits the graphics resident in a vault flash memory 73 to be updated in the field. That is, image data for any fixed portions of an inscription, a slogan, and the postal indicia are stored in flash memory 73 together with fonts for variable data that may be required in each of these images. A draw on the fly bit map image generator 75, which is more fully described in U.S. patent application Ser. No. 08/554,179 entitled MAIL HANDLING APPARATUS AND PROCESS FOR PRINTING AN IMAGE COLUMN-BY-COLUMN IN REAL TIME and filed on Nov. 11, 1995 and incorporated herein by reference, receives from CPU 51 authorization to print the desired postage together with any required variable data. Image generator 75 accesses flash memory 73 and builds the data image as a column-by-column bit stream which is ultimately provided to the driver circuits 77 of printheads 11 to produce the desired image in synchronization with relative movement between the mailpiece and printheads 11. Thus, if additional slogans, inscriptions, or indicia graphics for a different vendor-supplied printhead are desired, they can be downloaded from graphics interface box 71 to flash memory 73. However, in order to prevent the unauthorized downloading of graphics into postage meter 1, all of the graphics in graphics interface box 71 are either signed or encrypted in a known manner. A memory decoder circuit 71 decrypts the graphics data prior to its download into flash memory 73.

The bit map image data generated by image generator 75 is ciphered at data stream circuitry 79 rather than being sent in the clear to printer controller/security module 7. This provides a second level of security in addition to the security protocol which takes place between meter vault 3 and printer controller/security module 7. In a preferred embodiment, a session key negotiated by meter vault 3 and printer controller/security module 7 as part of the security protocol is used as part of the ciphering of the bit map image data. Printer controller/security module 7 receives and deciphers the bit map data and reformats the data for the specific drivers 77.

As previously discussed, connector 17 is utilized to connect meter vault 3 to external interface unit 19 when meter vault 3 is operated off of mailing machine 5 to paramatize meter vault 3 for manufacturing and service diagnostics. When meter vault 3 is mounted in mailing machine 5 to printer junction board 9, printer junction board 9 routes the EIU connection to a connector 81 on a back portion of mailing machine 5 to support an external interface unit 83 which is connected to connector 81. EIU 83 will receive power regulated by printer junction board 9. However, EIU 19 must supply its own power.

Printer controller/security module 7 includes a microcontroller 85 which sends to and receives from meter vault 3 encrypted information. Meter CPU 51 and microcontroller 85 each have the required keys stored therein to permit decrypting and utilization of the encrypted information passed therebetween. Software in microcontoller 85 supports DES encryption and decryption operations and a small amount of EEPROM 87 in microcontroller 85 is required to compute random numbers needed for executing a successful security protocol with meter vault 3. That is, when a postage transaction is requested by an operator via mailing machine keyboard 41, and CPU 51 has determined that the desired postage is available in the meter, a security protocol occurs between CPU 51 and microcontroller 85 prior to authorizing printing of the indicia. The security protocol between CPU 51 and microcontroller 85 can be done in a conventional manner and typically involves the exchange of encrypted data as a way of authenticating both meter vault 3 and printer controller/security module 7. One such security protocol is set forth in the previously mentioned U.S. Pat. No. 4,900,903.

Upon successful completion of the security protocol, printer controller/security module 7 generates and sends to CPU 51 data, which may be ciphered or image adhered. The data is then used at image data stream cipher block circuitry 79 to cipher the bit map image data generated by bit map image generator 75. The ciphered data could be encrypted or scrambled or a combination of both. The important point is that the bit map image data is not sent in the clear from meter vault 3 to printer controller/ security module 7. The ciphered bit map image data is sent via printer junction board 9 to shift register 89 of printer controller/security module 7. The ciphered bit map data is then transferred in parallel to decipher circuitry 91. Decipher circuitry 91 was previously downloaded with a decipher unit and additional data from microcontroller 85 after the successful completion of the security protocol in order to permit deciphering of the ciphered bit map image data in printer controller/security module 7. The ciphered bit map image data is deciphered at decipher circuitry 91 and passed via print buffer 93 to printhead format conversion circuitry 95. Printhead format conversion circuitry 95 reformats the deciphered image data to interface directly with printhead driver circuits 77.

A mail position decoder 97 provides signals to printhead conversion circuitry 95 which are indicative of the relative position of the mailpiece to the printheads 11 so that synchronized energizing of printheads 11 occurs to produce the desired postal image.

The modular design of postage meter 1 set forth above permits the easy removal of meter vault 3 and printhead control and security module 7 from mailing machine 5. Each of the connectors 17, 21, 23, 59, 65, and 67 can be standard quick disconnect electrical pin type connectors which facilitate module removal and replacement.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A mailing system comprising:

a base having a printing mechanism mounted therein, means for feeding a mailpiece to the printing mechanism, and a microcontroller for controlling the feeding means, wherein the printing mechanism prints an indication of postage value on the mailpiece;

a plug-in meter vault module having a securely sealed housing, accounting circuitry mounted in the securely sealed housing, and a first plug-in connector; and a plug-in printing mechanism controller and security module for securely controlling printing operation of the printing mechanism based on data received from the plug-in meter vault module, the plug-in printing mechanism controller and security module including a second plug-in connector;

wherein the first and second plug-in connectors are removably mounted in the base in respective third and fourth complementary plug-in connectors to permit electrical communication between the plug-in meter vault module, the microcontroller, and the plug-in printing mechanism controller and security module while allowing for easy removal of the plug-in meter vault module and the plug-in printing mechanism controller and security module from the base; and the printing mechanism has a quick disconnect electrical interface with the plug-in printing mechanism controller and security module.

2. A mailing system as recited in claim 1, wherein the plug-in meter vault module and the plug-in printing mechanism controller and security module are removably mounted in the base without being directly mechanically coupled to each other.

3. A mailing system as recited in claim 2, further comprising a printer junction board which is mounted in the base in electrical communication with the microcontroller, the printer junction board including the third and fourth complementary plug-in connectors such that all electrical communication between the microcontroller, the plug-in meter vault and the plug-in printer controller and security module occurs via the printing mechanism junction board.

4. A mailing machine as recited in claim 3, wherein the printer junction board is mounted to the base via a plug-in electrical interface.

* * * * *